3,001,857
UP-GRADING OF DIESEL FUELS
Robert T. Pollock, 11 E. 87th St., Apt. 6B,
New York, N.Y.
No Drawing. Filed June 5, 1958, Ser. No. 739,990
11 Claims. (Cl. 44—57)

This invention relates to diesel fuels and relates more particularly to the up-grading of so-called low-grade diesel fuels, that is, fuels below around 50 cetane.

The high speed diesel engine has brought about a rather rigidly established specification for the fuel to be used in it. The specification fuel has a minimum ignition quality (cetane value) of 50 cetane, and numerous other restrictions of importance, such as flash point, pour point, cloud point, sulfur content, color, carbon residue, viscosity, water and sediment, ash and distillation curve. In general, a diesel fuel of this type meeting these specifications is known as a high-grade or premium diesel fuel.

Because of the demand for these premium fuels and an ever increasing supply problem, much effort has been expended in the carrying out of explorations for the possible use of lower grade fuels such, for example, as 20–45 cetane fuels, for these engines. These fuels are lower in cost, have higher heat value (B.t.u.) and are in greater supply. Furthermore, many of them have good or satisfactory specifications otherwise.

The difficulties met with in the effort to use lower grade, lower cetane value fuels in diesel engines are many. Depending upon how low the cetane value of the fuel is and the specifications of that fuel—there will be poor to impossible starting ability, knocking and roughness in engine operation, obnoxious odor, increased deposits in the fire zone and around the injector nozzle tips and in some cases degradation of the lubrication oil.

With good or satisfactory specifications of the fuel other than the ignition quality, an increase in this ignition quality, with a proper additive, will improve or correct the starting ability, knocking or roughness in engine operation, be beneficial in reduction of deposits and odor and have no degrading effect on the lubricating oil.

An extremely large number of cetane raising agents or ignition quality improvers, hereinafter called diesel additives, have been developed for raising the cetane value or ignition quality of the lower cetane fuels. Some of these show up extremely well for this purpose while most are fair to poor. A few have shown excellent quality in respect of engine starting and provide substantial boost in the "flammability factor" and cetane value of the fuel. In the case of the poor starting or low flammability-factor additives, the result of their addition to the fuel is the same as if the fuel had not been doped with the additive.

Practically all diesel additives appear to be more effective in their capacity to raise the cetane value, in fuels in which the paraffin hydrocarbons predominate; and the higher the aromatics the lower the susceptibility in general. Some additives are unstable of themselves or blended with the fuel; some are obnoxious, such for example, as tetranitromethane; and, some are hazardous.

There is however one vital characteristic which has heretofore militated against the more extensive use of diesel additives and that is their high cost, for in dealing with diesel fuels there is not only the question of performance but the question of economics, and this last is a uniquely determining factor in the use of the diesel engine at all.

It is therefore among the objects of this invention to make it possible to up-grade low grade hydrocarbon diesel fuels by means of diesel additives so as to impart to them starting and running properties characteristic of high grade or premium diesel fuels and to enable this to be accomplished at a cost of additive material which will make such up-grading commercially feasible and economic.

It is another object of this invention to provide a new method for treating low-grade hydrocarbon diesel fuels to raise their cetane rating and engine-starting properties to suit engine requirements; to provide a new and useful hydrocarbon diesel fuel; and, to provide a new and useful additive for up-grading low grade hydrocarbon diesel fuels.

It is still another object of this invention to provide a diesel additive which will not only satisfy the requirement that it be sufficiently low in cost as to be commercially economic but will impart to a low grade fuel in which it is used, a starting capacity comparable to that obtainable from the use in such fuels of known high volatility starting materials, such for example, as diethyl ether.

Other and further objects of this invention will appear from the following description and the appended claims and from the practice of this invention.

Speaking generally, this invention comprises the preforming of a composite diesel additive by the blending together in a determined ratio of a high-grade, highly susceptible hydrocarbon diesel oil and a diesel additive, the latter being readily soluble in the fuel and, preferably, relatively low in cost, so as to provide the preformed composite additive of this invention, and the adding of a determined proportion of this composite additive to the low-grade diesel fuel sufficient to raise the ignition- and starting-quality of the fuel to a value at least sufficient to satisfy the engine fuel requirements. By blending the high-grade diesel fuel and the readily soluble diesel additive together and adding them to the low-grade fuel as a composite diesel additive, a substantially greater increase in cetane number of the low-grade fuel is obtained than if they were added separately; a truly synergistic effect.

Desirably, the readily soluble diesel additive employed in producing the preformed composite additive of this invention is an alkyl nitrate such, for example, as methyl nitrate, n-butyl nitrate or iso-amyl nitrate, or is an N-nitrate, n-butyl nitrate or iso-amyl nitrate, or is an N-alkyl, N-nitro, alkyl carbamate such, for example, as N-alkyl, N-nitro, N-iso-propyl, N-nitro, iso-propyl carbamate, all of which are powerful cetane-improving materials readily soluble in high-grade diesel fuels. Preferably however, the diesel additive employed is the methyl nitrate since the blending together in the ratios hereinafter set forth, of methyl nitrate and a high-grade diesel fuel produces a composite additive that is not only highly beneficial as respects ignition-quality improvement properties but is most beneficial as respects cost.

The cost of material in most good diesel additives may for the sake of illustration be taken as about ten cents per pound, and of most high grade diesel fuels as about one and a half cents per pound. Thus in the use of methyl nitrate with a high grade diesel fuel in a blend of for example, a 1:1 ratio, that is, equal parts by weight, in accordance with this invention, the composite additive thus formed would cost, at current prices, only about six (6) cents per pound; a highly commercially attractive figure and one not heretofore known to be obtainable for an acceptable diesel additive.

The pre-forming of the composite diesel additive has the further advantage that when employing the preferred methyl nitrate, in itself a highly volatile and highly explosive chemical, the methyl nitrate is rendered safe for handling by its being first dissolved in the high-grade diesel fuel. The methyl nitrate, which otherwise would explode violently on reaching a temperature of 65–66° C. may thus be handled with complete safety when in association with the high-grade fuel of the composite additive. Advantageously, and in accordance with a further feature of this invention, the methyl nitrate, instead of being added directly to the high-grade diesel fuel to form the composite additive, may be first blended by gentle agitation with a liquefied low melting point paraffin wax, e.g. a wax having a melting point of 50° C. or below so as to be liquefiable at a temperature sufficiently below the explosion temperature (65–66° C.) of the methyl nitrate as to avoid any danger of explosion, and the mixture allowed to solidify. This solid state wax-methyl nitrate mixture in itself constitutes a high energy fuel composition which may be safely handled and is readily soluble as a diesel additive in the high-grade diesel fuel, to form therewith the desired composite diesel additive.

In the blending of the high-grade diesel fuel and the readily soluble diesel additive to produce the pre-formed composite additive, the weight ratio of additive to fuel is advantageously in the range of from about 1:1 to about 1:4, in parts by weight, with a ratio of 1:2 being preferred. It will be observed that with such ratios the concentration of diesel additive in the high-grade diesel fuel of the composite additive, is very high.

The quantity of this composite additive to be added to the low-grade diesel fuel, that is, the concentration of composite additive in the low grade fuel, is advantageously in the range of from about 0.1% to about 6.0% of the total weight of the low-grade fuel with its content of composite additive, depending on the magnitude of the increase in ignition quality (cetane value) required to satisfy the engine requirements. In general, the greater the cetane increase required in the low-grade fuel, the greater the quantity of composite additive required, but for moderate increases of say from about three to about seven cetane numbers, a concentration in the range of from about 0.2% wt. to about 1.0% will be found to be highly satisfactory. However, it is characteristic of low-grade diesel fuels that on being doped with known diesel additives they tend to level off—stop increasing—in cetane value at a maximum of about 6% wt. concentration of the additive and, as to some, even down to 2.5% concentration with the same additives. On the other hand, the high-grade fuels shows a substantially linear increase in cetane number with increasing concentration of good diesel additives and can be raised to 80 and over 100 cetane (extrapolation) with 6% concentration and less—even down to 2% concentration with good additives.

This latter characteristic of high grade diesel fuels may be the underlying reason why a substantially greater increase in cetane number of the lower grade diesel fuels is obtainable when they are treated with the preformed composite diesel additive of this invention than when they are treated separately with the components of the composite additive but in the same quantities. By preforming the composite diesel additive of this invention, a synergistic effect is obtained in that as much as a fifty percent (50%) greater increase in cetane number gain may be realized in the use of the composite additive than is realizable in the treatment of the low-grade diesel fuel with the additives separately. Without any intention of being bound by any theory as to the cause of such increase it may well be that this synergistic phenomenon is due to the very great increase in cetane value—ignition quality—in the high grade, highly susceptible diesel fuel because of the very high percent concentration in it of the diesel additive employed. Moreover, as noted above, all diesel additives appear to be more effective in their capacity to raise the cetane value, in fuels in which the paraffin hydrocarbons predominate; and the higher the aromatics the lower the susceptibility in general. Preferably, therefore, the high grade diesel fuel forming a component of the composite additive is one having a minimum paraffinic content of about 50% and a maximum aromatic content of about 19% since such fuels will, in general, be found to have a cetane number of not less than about 47–50 and be highly susceptible to the cetane-boosting properties of the diesel additive with which they are composited.

In the up-grading of low grade hydrocarbon diesel fuels according to and with the composite diesel additive of this invention, the respective amounts of diesel additive and high grade fuel oil to be employed in formulating the composite diesel additive are conveniently measured in terms of a determined percentage by weight of the weight of lower grade fuel oil with its content of composite additive. Thus, for example, assuming a given quantity of low-grade fuel after treatment by the addition of 0.2% wt. of the composite additive, has a weight of 1000 pounds, the weight of composite additive employed would be 2 pounds and of oil, 998 pounds. Hence, if the weight ratio of diesel additive to high-grade fuel oil in the composite additive is 1:1, for example, and the selected concentration of composite diesel additive in the low grade fuel oil is to be 0.1% wt., the composite additive would consist of 1 pound of diesel additive, e.g. methyl nitrate, and 1 pound of high grade fuel oil. This would be added to 998 pounds of the low grade fuel oil to be treated.

TABLE 1

"Specifications of high grade, highly susceptible, diesel fuel oils"

|  | U.S.N. Spec. 7-0-2e | "Esso" 208 | No. 2 Dist. N.Y. Central | Penn. (Valvoline) | Illinois | Mich. |
|---|---|---|---|---|---|---|
| Cetane, Min | 50 | 54.6 | 50 | 61 | 54 | 64 |
| 90% Dist., °F. max | 675 | 576 | 621 | 594 | 588 | 725 |
| E. Pt., °F. max | 725 | 627 | 678 | 670 | 650 | 760 |
| Flash Pt. PM, °F. min | 140 | 186 | 165 | 166 | 176 | 160 |
| Pour Pt., °F. max | 0 | −5 | 0 | −5 | 10 | +30 |
| Cloud Pt., °F. max | 10 | | | | | |
| Vis. SSU, 100° F | 32–45 | 35.5 | 36.3 | 33.4 | 37.8 | 45.5 |
| Car. Res., 10% Bot. max | .20 | | 0.09 | trace | 0.01 | 0.06 |
| Sulfur, percent max | 1.00 | 0.33 | 0.31 | 0.12 | 0.24 | 0.40 |
| Water and Sediment, percent max | 0.03 | nil | | nil | nil | nil |
| Corrosion | pass | pass | | pass | pass | pass |
| Color, max | 5 | [1] 1.5 | | [1] +10 | 2 | 2.5 |
| Ash, percent max | 0.01 | | 0.0 | nil | nil | nil |
| Gravity, API | | 38.1 | 35 | 44.7 | 36.3 | 35 |

|  | Cetane | Aromatics | Paraffinic | Lb./Gal. | B.t.u./Gal. |
|---|---|---|---|---|---|
| 7-0-2e | 52 | 15.5 | 55.9 | 6.972 | 137,280 |
| Mid-Cont. Str. Run | 55 | 13 | 60.2 | | |
| Fischer-Tropsch | 83.7 | 0.0 | 91.0 | 6.430 | 130,080 |

[1] NPA.

Typical high grade, highly susceptible hydrocarbon diesel oils (50 cetane and above) which are suitable for use in the production of the composite diesel additive of this invention are the "Esso" 208 of 52–54 cetane value, the New York Central "No. 2 distillate fuel oil" of 50 cetane value, and other diesel oils whose ASTM specifications are as shown in Table 1.

Typical low cetane (ignition quality) diesel oils (below 50 cetane) capable of being up-graded in accordance with this invention are the No. 2 fuel oil and other diesel oils whose ASTM specifications are as shown in Table 2 below:

TABLE 2
*"Specifications of fuel oils below about 50 cetane"*

|  | A No. 2 Fuel Oil (By Test) | A Burner Oil (By Test) | N.Y. Central Required [1] | U.S. Dept. Commerce No. 2 [1] | U.S. Military Required No. 2 Class [1] |
|---|---|---|---|---|---|
| Flash Pt. P.M. min., °F | 146 | 203 | 125 | 100 min. | 140 |
| Pour Pt., °F | −10 | −12 | −10 | 20 | 20 |
| Viscosity SSU, 100° F | 34.4 | 35.2 | 32–45 | 40 | 32–45 |
| Water and Sediment, Percent max | trace-nil | nil | 0.1 | 0.1 | 0.05 |
| Sulfur, Percent max | 0.16 | 0.22 | 1.0 | 1.0 | 1.25 |
| Carbon Res., 10% Bot. max | 0.056 | 0.21 | 0.35 | 0.35 | 0.20 |
| Ash, Percent max | nil | nil | 0.02 |  | 0.01 |
| Corrosion | pass | pass | pass |  | pass |
| 90% Dist. Pt. max., °F | 590 | 582 |  | 675 | 675 |
| Cetane, min | 42.9 | 39 | 40 |  | 40 |
| Gravity API at 60° F | 31.9 | 31.9 |  | 26 min. |  |
| Color, NPA | 1.5 | 4.5 NPA |  |  | 5 max. |
| E. Pt., °F | 655 | 640 |  |  | 725 |
| I.B. Pt., °F | 330 | 420 |  |  |  |
| Cloud Pt |  |  |  |  | 30 max. |

|  | Cetane | Percent Aromatics | Percent Paraffinic | Lb. Per Gal. | B.t.u./Gal. |
|---|---|---|---|---|---|
| Cat. Crkd. Houdry Recycle | 29 | 30.5 | 28.4 | 7.462 | 142,640 |
| Cat. Crkd | 41 | 24 | 48.1 |  |  |

[1] The specifications of number 2 Fuel Oils are roughly controlled by the above. Where blanks occur, the specs. are not supplied, or are set by negotiation.
The 29 Cetane oil above is considered by authorities as most desirable in all respects except Cetane.

The following Table 3 illustrates the effect on cetane value of each of the diesel additives, methyl nitrate and n-butyl nitrate and iso-amyl nitrate, when added to the low grade No. 2 fuel oil of 42.87 cetane of Table 2 above:

TABLE 3

| Additive | Percent Wt. | Average Cetane No. Blank | Average Cetane No. With Additive |
|---|---|---|---|
| Methyl Nitrate | 0.1 | 42.87 | 45.23 |
| n-Butyl Nitrate | 0.1 | 42.87 | 45.23 |
| Iso-Amyl Nitrate | 0.25 | 42.87 | 47.00 |

The following Table 4 illustrates the average increase of cetane value resulting from the addition to the No. 2 fuel oil of 42.87 of Table 2 above, of various percentages of the high grade "Esso" 208 (cetane No. 54.6) and No. 2 distillate fuel oil (cetane No. 50) of Table 1 above:

TABLE 4

| Percent Wt. of Oil Added | Additive Oil | Average Cetane Increase | Additive Oil | Average Cetane Increase |
|---|---|---|---|---|
| 0.1 | "Esso" 208 | 0.0091 | No. 2 Dist. | 0.0071 |
| 0.2 | do | 0.0182 | do | 0.0142 |
| 0.4 | do | 0.0364 | do | 0.0284 |
| 0.5 | do | 0.0455 | do | 0.0355 |
| 0.6 | do | 0.0546 | do | 0.0426 |
| 0.8 | do | 0.0728 | do | 0.0568 |

It is obvious that the above cetane increases are so small that, for all practical purposes, they could be disregarded.

The following examples serve to compare the effect on the cetane number of a typical low-grade diesel fuel, the No. 2 fuel oil (cetane No. 42.87) of Table 2, resulting from the treatment of such oil with various percentage amounts (by weight) and ratios of diesel additives (methyl nitrate, n-butyl nitrate, iso-amyl nitrate) and high-grade-diesel oils ("Esso" 208 and No. 2 distillate fuel oil of Table 1) when these additives and high-grade oils are added to the low-grade oil separately, that is, on an "independent" basis, with the effect obtained when these same additives and high-grade oils are pre-blended, in the same percentage amounts and ratios, into the composite diesel additive of this invention and this composite additive added to the same low-grade oil, that is, on a co-operative or synergistic basis:

EXAMPLE 1

| CO-OPERATIVELY | Cetane |
|---|---|
| 1:1 ratio with "Esso" 208, No. 2 fuel oil [0.1% methyl nitrate+0.1% "Esso" 208] | 42.87 |
| Then added to 99.8% of No. 2 fuel oil | 47.1 |
| Cetane gain | 4.23 |

| INDEPENDENTLY | Cetane |
|---|---|
| No. 2 fuel oil | 42.87 |
| No. 2 fuel oil+0.1% wt. methyl nitrate | 45.23 |
| No. 2 fuel oil+0.1% wt. methyl nitrate+0.1% "Esso" 208 | 45.24 |
| Maximum cetane gain (45.24−42.87) | 2.37 |

This example shows that when using "Esso" 208 as the high grade diesel oil and with a 50% concentration of methyl nitrate in the composite additive, treatment with the composite additive offers the advantage of about a 78% greater gain in cetane of the No. 2 fuel oil than does treatment with the composite additive components independently.

EXAMPLE 2

| CO-OPERATIVELY | Cetane |
|---|---|
| 1:1 ratio with No. 2 distillate, No. 2 fuel oil [0.1% methyl nitrate+0.1% No. 2 distillate] | 42.87 |
| Then added to 99.8% of No. 2 fuel oil | 46.4 |
| Cetane gain | 3.53 |

INDEPENDENTLY

| | Cetane |
|---|---|
| No. 2 fuel oil | 42.87 |
| No. 2 fuel oil+0.1% methyl nitrate | 45.23 |
| No. 2 fuel oil+0.1% methyl nitrate+0.1% No. 2 distillate | 45.24 |
| Maximum cetane gain (45.24−42.87) | 2.37 |

This example shows that with the same 50% concentration of methyl nitrate in the composite additive as in Example 1 but with a different high-grade diesel oil (No. 2 distillate), treatment with the composite additive offers the advantage of about a 50% greater gain in cetane than does treatment with the composite additive components independently.

EXAMPLE 3

CO-OPERATIVELY

| | Cetane |
|---|---|
| 1:2 ratio with No. 2 distillate, No. 2 fuel oil [0.1% methyl nitrate+No. 2 distillate 0.2%] | 42.87 |
| Then added to 99.7% of No. 2 fuel oil | 45.6 |
| Cetane gain | 2.73 |

INDEPENDENTLY

| | Cetane |
|---|---|
| No. 2 fuel oil | 42.87 |
| No. 2 fuel oil+0.1% wt. methyl nitrate | 45.23 |
| No. 2 fuel oil+0.1% wt. methyl nitrate+0.2% No. 2 distillate | 45.24 |
| Maximum cetane gain (45.24−42.87) | 2.37 |

This example shows that in comparison to Examples 1 and 2, a doubling of the amount of high-grade fuel oil (No. 2 distillate) in the composite additive, from 0.1% to 0.2% (1:2 ratio), that is, reducing the concentration of the methyl nitrate in the composite additive from 50% to 33⅓%, causes some reduction in the cetane gain but that treatment with the composite additive under these conditions offers the advantage of about a 15% greater increase in cetane than does treatment with the composite additive components independently.

EXAMPLE 4

CO-OPERATIVELY

| | Cetane |
|---|---|
| 1:2 ratio with No. 2 distillate, No. 2 fuel oil [0.3% methyl nitrate+No. 2 distillate 0.6%] | 42.87 |
| Then added to 99.1% of No. 2 fuel oil | 49.1 |
| Cetane gain | 6.23 |

INDEPENDENTLY

| | Cetane |
|---|---|
| No. 2 fuel oil | 42.87 |
| No. 2 fuel oil+0.3% wt. methyl nitrate | 48.2 |
| No. 2 fuel oil+0.3% wt. methyl nitrate+0.6% wt. No. 2 distillate | 48.24 |
| Maximum cetane gain | 5.37 |

This example shows that in the use of the same additive components and in the same ratio (1:2) as in Example 3, but in three times the quantity, the total cetane gain, both on the co-operative and the independent basis, is commensurate with the increased amount of methyl nitrate employed, but that with the same concentration, 33⅓%, of nitrate in the composite additive as in Example 3, treatment with the composite additive offers the advantage of about a 16% greater increase in cetane than does treatment with the additive components independently.

EXAMPLE 5

CO-OPERATIVELY

| | Cetane |
|---|---|
| 1:2 ratio with No. 2 distillate, No. 2 fuel oil [0.1% n-butyl nitrate+No. 2 distillate 0.2%] | 42.87 |
| Then added to 99.7% of No. 2 fuel oil | 45.6 |
| Cetane gain | 2.73 |

INDEPENDENTLY

| | Cetane |
|---|---|
| No. 2 fuel oil | 42.87 |
| No. 2 fuel oil+0.1% wt. n-butyl nitrate | 45.2 |
| No. 2 fuel oil+0.1% wt. n-butyl nitrate+0.2% wt. No. 2 distillate | 45.21 |
| Maximum cetane gain | 2.34 |

This example shows that with the same amounts, ratio and concentrations of additive components as in Example 3, but with n-butyl nitrate substituted for methyl nitrate, about 16% greater gain in cetane number is offered by the treatment with the composite additive.

EXAMPLE 6

CO-OPERATIVELY

| | Cetane |
|---|---|
| 1:2 ratio with No. 2 distillate, No. 2 fuel oil [0.25% iso-amyl nitrate+No. 2 distillate 0.5%] | 42.87 |
| Then added to 99.25% of No. 2 fuel oil | 48.9 |

INDEPENDENTLY

| | Cetane |
|---|---|
| No. 2 fuel oil | 42.87 |
| No. 2 fuel oil+0.25% wt. iso-amyl nitrate | 47.0 |
| No. 2 fuel oil+0.25% wt. iso-amyl nitrate+0.5% wt. No. 2 distillate | 47.04 |
| Maximum cetane gain | 4.17 |

This example shows that when using No. 2 distillate as the high-grade diesel oil and iso-amyl nitrate instead of methyl nitrate as the other component of the composite diesel additive, the total cetane gain, both on the co-operative and independent basis, is commensurate with the amount, 0.25%, of iso-amyl nitrate employed, and that even with the relatively low concentration, 33⅓%, of the nitrate in the additive, treatment with the composite additive offers the advantage of about a 45% greater increase in cetane than does treatment with the additive components independently.

In all of the foregoing examples, the composite additive was pre-formed as a separate blend, the components being well mixed together and allowed to set for a short period before being added to the base fuel to be treated. In the determination of the effects of the components when added separately, there was no pre-blending but the components were each added directly to the base fuel separately. The determinations as to cetane number of the base fuel, treated and untreated, were carried out in accordance with the procedure therefor as prescribed by A.S.T.M. test No. D613–48T.

What is claimed is:

1. The method of up-grading a low-grade diesel fuel which comprises incorporating in the low-grade diesel fuel a preformed composite diesel additive in a quantity which, by weight, is in the range of from about 0.1% to about 6% of the total weight of the low-grade diesel fuel with its content of composite additive, said composite additive consisting essentially of a high-grade hydrocarbon diesel oil and a substance selected from the group of substances consisting of alkyl nitrates and N-alkyl, N-nitro, alkyl carbamates, in a ratio by weight of from about 1:1 to about 1:4.

2. The method of claim 1 in which said substance is methyl nitrate.

3. The method of claim 1 in which said substance is n-butyl nitrate.

4. The method of claim 1 in which said substance is iso-amyl nitrate.

5. The method of claim 1 in which said substance is N-iso-propyl, N-nitro, iso-propyl carbamate.

6. The method of up-grading a low-grade diesel fuel below about 50 cetane which comprises preforming a composite diesel additive by blending together methyl nitrate and a high-grade diesel oil of at least 50 cetane in a ratio by weight in the range of from about 1:1 to about 1:4, and incorporating said composite additive in the low-grade diesel oil in an amount which, by weight, is in the range of from about 0.1% to about 6% of the total weight of the low-grade diesel fuel with its content of composite additive.

7. A composite diesel additive consisting essentially of a blend of a high-grade hydrocarbon diesel oil and a substance selected from the group of substances consisting of alkyl nitrates and N-alkyl, N-nitro, alkyl carbamates, in a ratio by weight of from about 1:1 to about 1:4.

8. A composite diesel additive in accordance with claim 7 in which said substance is methyl nitrate.

9. A composite diesel additive in accordance with claim 7 in which said substance is N-iso-propyl, N-nitro, iso-propyl carbamate.

10. A composite diesel additive consisting essentially of a blend of a high-grade hydrocarbon diesel oil and a substance selected from the group of substances consisting of alkyl nitrates and N-alkyl, N-nitro, alkyl carbamates, in a ratio by weight of from about 1:1 to about 1:4, said high-grade hydrocarbon diesel oil having a paraffinic content of at least about 50% and an aromatic content of not more than about 19%.

11. A composite diesel additive in accordance with claim 10 in which said hydrocarbon diesel oil has a cetane number of at least about 50, and in which said substance is methyl nitrate.

References Cited in the file of this patent

UNITED STATES PATENTS 2,720,869　　Bevans ---------------- Oct. 18, 1955

OTHER REFERENCES

Journal of the Institute of Petroleum, 1939, vol. 26, No. 192, pages 657–677, "Experiments With Doped Fuels for High-Speed Diesel Engines," by Broeze and Hinze.